(12) United States Patent
Migita

(10) Patent No.: US 7,192,233 B2
(45) Date of Patent: Mar. 20, 2007

(54) LOOSENESS PREVENTIVE NUT

(75) Inventor: Hiroaki Migita, Hiroshima (JP)

(73) Assignee: Eco World Company, Limited, Hiroshima (JP)

( * ) Notice: Subject to any disclaimer, the term of this patent is extended or adjusted under 35 U.S.C. 154(b) by 0 days.

(21) Appl. No.: 10/967,197

(22) Filed: Oct. 19, 2004

(65) Prior Publication Data

US 2005/0260057 A1 Nov. 24, 2005

(30) Foreign Application Priority Data

May 21, 2004 (KR) .................. 10-2004-0036435

(51) Int. Cl.
*F16B 37/16* (2006.01)
(52) U.S. Cl. .................. 411/437; 411/230; 411/291
(58) Field of Classification Search ........... 411/230, 411/437, 291, 222, 285, 288
See application file for complete search history.

(56) References Cited

U.S. PATENT DOCUMENTS

| | | | | | |
|---|---|---|---|---|---|
| 168,830 | A | * | 10/1875 | Chapman | 411/230 |
| 171,898 | A | * | 1/1876 | Wiles | 411/286 |
| 188,055 | A | * | 3/1877 | Johnson | 411/291 |
| 378,779 | A | * | 2/1888 | Edgar | 411/230 |
| 394,948 | A | * | 12/1888 | Allen et al. | 411/291 |
| 465,094 | A | * | 12/1891 | Fougere | 411/230 |
| 483,676 | A | * | 10/1892 | Neil | 411/81 |
| 529,034 | A | * | 11/1894 | Leidgen | 411/291 |
| 609,144 | A | * | 8/1898 | Goddin | 411/236 |
| 678,629 | A | * | 7/1901 | Smith | 411/291 |
| 815,541 | A | * | 3/1906 | Leatherman | 411/291 |
| 838,948 | A | * | 12/1906 | Bryar | 411/291 |
| 992,137 | A | * | 5/1911 | Nowak | 411/230 |
| 995,136 | A | * | 6/1911 | Harrris | 411/230 |
| 1,019,379 | A | * | 3/1912 | Taft | 411/291 |
| 1,039,916 | A | * | 10/1912 | Farrell | 411/291 |
| 1,075,617 | A | * | 10/1913 | Whitehead | 411/230 |
| 1,087,056 | A | * | 2/1914 | Ward | 411/291 |
| 1,113,419 | A | * | 10/1914 | Dollman | 411/288 |
| 1,120,954 | A | * | 12/1914 | Maher | 411/291 |
| RE13,867 | E | * | 1/1915 | Taft | 411/291 |
| 1,263,217 | A | * | 4/1918 | Fine | 411/291 |
| 1,291,114 | A | * | 1/1919 | Pickin | 411/285 |
| 1,299,702 | A | * | 4/1919 | Glass | 411/291 |
| 1,340,496 | A | * | 5/1920 | Patterson | 411/291 |
| 1,347,124 | A | * | 7/1920 | Schrader | 411/230 |
| 1,447,578 | A | * | 3/1923 | Thomas | 411/230 |
| 1,760,113 | A | * | 5/1930 | Brown | 411/291 |

(Continued)

*Primary Examiner*—Robert J. Sandy
*Assistant Examiner*—Jeffrey A. Sharp
(74) *Attorney, Agent, or Firm*—Reed Smith LLP; Stanley P. Fisher, Esq.; Juan Carlos A. Marquez, Esq.

(57) ABSTRACT

The present invention has been made to solve the above problems, and accordingly an object thereof is to provide a looseness preventive nut which does not loosen even if vibrations are applied, and can be used as a single nut. In at least a first embodiment, the invention provides a looseness preventive nut 1 which is a nut threadedly engaging with a bolt 10, the nut being configured so that a lateral groove 3 extending in the radial direction in the range such that at least a part of a threaded portion 2 is cut, preferably in the range beyond the centerline C of the nut, is formed at a position slightly lower than a substantially middle point of the nut in the height direction.

1 Claim, 3 Drawing Sheets

U.S. PATENT DOCUMENTS

| | | | | |
|---|---|---|---|---|
| 1,833,563 A | * | 11/1931 | Easter | 411/291 |
| 1,852,203 A | * | 4/1932 | Easter | 411/291 |
| 1,861,833 A | * | 6/1932 | Bergstrom | 411/291 |
| 2,007,171 A | * | 7/1935 | Bergstrom | 411/291 |
| 2,007,293 A | * | 7/1935 | Cayouette | 411/285 |
| 2,035,859 A | * | 3/1936 | Bergstrom | 470/19 |
| RE20,915 E | * | 11/1938 | Bergstrom | 411/291 |
| 2,142,819 A | * | 1/1939 | Olson | 411/288 |
| 2,142,820 A | * | 1/1939 | Olson | 411/288 |
| 2,213,353 A | * | 9/1940 | Whitcombe | 411/288 |
| 2,221,961 A | * | 11/1940 | Allen et al. | 411/288 |
| 2,231,130 A | * | 2/1941 | Lehre | 411/285 |
| 2,235,405 A | * | 3/1941 | Markey | 411/280 |
| 2,243,515 A | * | 5/1941 | Van Sant | 411/291 |
| 2,282,641 A | * | 5/1942 | Corey | 285/2 |
| 2,304,310 A | * | 12/1942 | Luce | 411/288 |
| 2,367,259 A | * | 1/1945 | Beach | 411/285 |
| 2,391,712 A | * | 12/1945 | King et al. | 470/19 |
| 2,391,902 A | * | 1/1946 | Hosking | 411/288 |
| 2,422,833 A | * | 6/1947 | King et al. | 411/285 |
| 2,472,421 A | * | 6/1949 | Hamil et al. | 403/21 |
| 2,487,219 A | * | 11/1949 | Butler | 411/290 |
| 3,087,525 A | * | 4/1963 | Nyswaner et al. | 411/230 |
| 3,262,481 A | * | 7/1966 | Hanfland | 411/291 |
| 3,265,109 A | * | 8/1966 | Hanfland | 411/291 |
| 3,385,339 A | * | 5/1968 | Dahl | 411/288 |
| 3,501,995 A | * | 3/1970 | Lanius, Jr. | 411/437 |
| 5,662,443 A | * | 9/1997 | Dziaba | 411/291 |
| 5,662,445 A | * | 9/1997 | Harbottle et al. | 411/433 |
| 6,146,074 A | * | 11/2000 | Tutikawa | 411/275 |
| 6,168,361 B1 | * | 1/2001 | Adler | 411/433 |
| 6,851,905 B2 | * | 2/2005 | Manfred | 411/286 |
| 2001/0018014 A1 | * | 8/2001 | Ito | 411/288 |
| 2004/0028501 A1 | * | 2/2004 | Haraldsson et al. | 411/437 |

* cited by examiner

[Fig. 1]
(a)
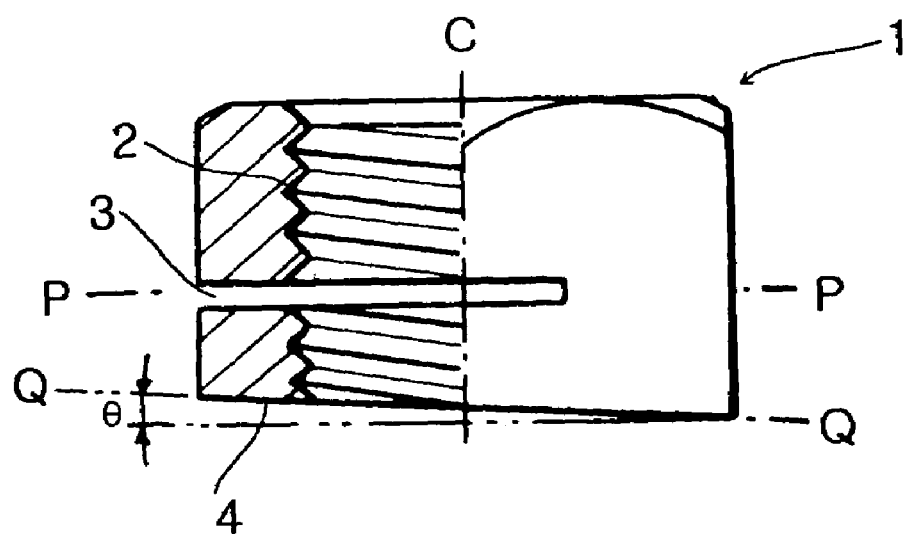
(b)
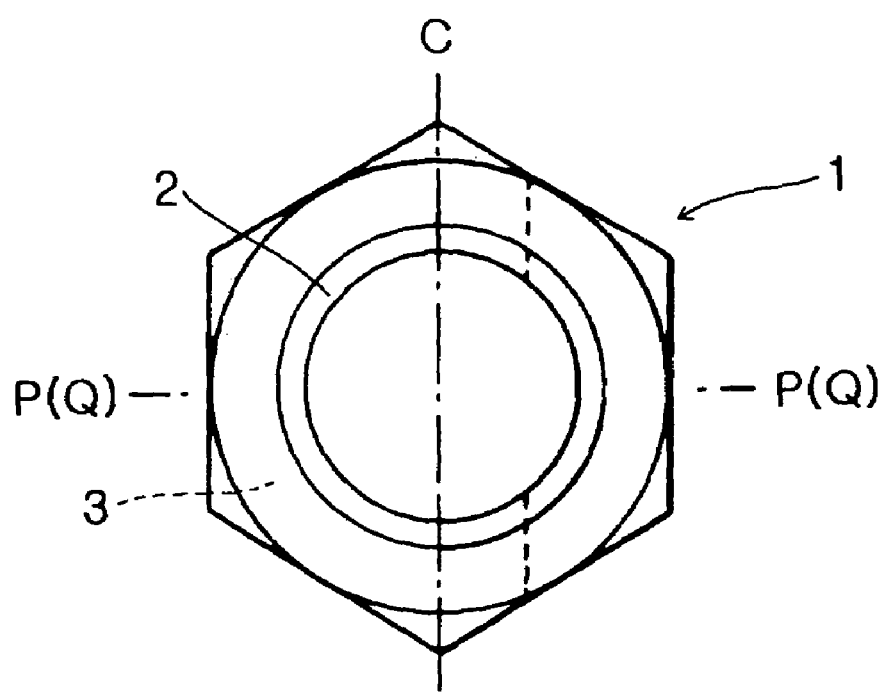

[Fig. 2]
(a)
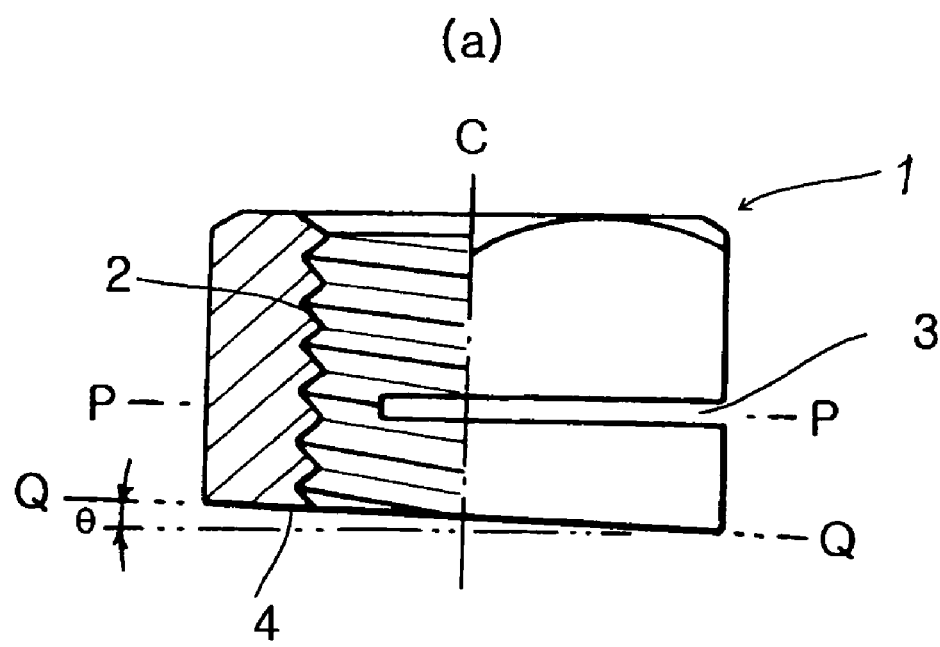
(b)
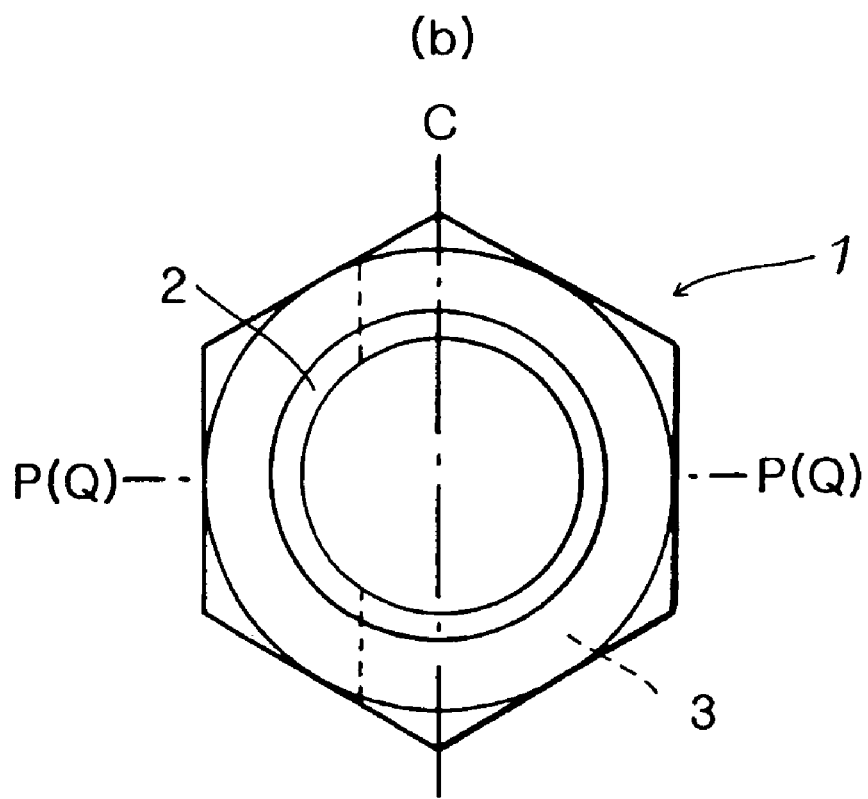

[Fig. 3]
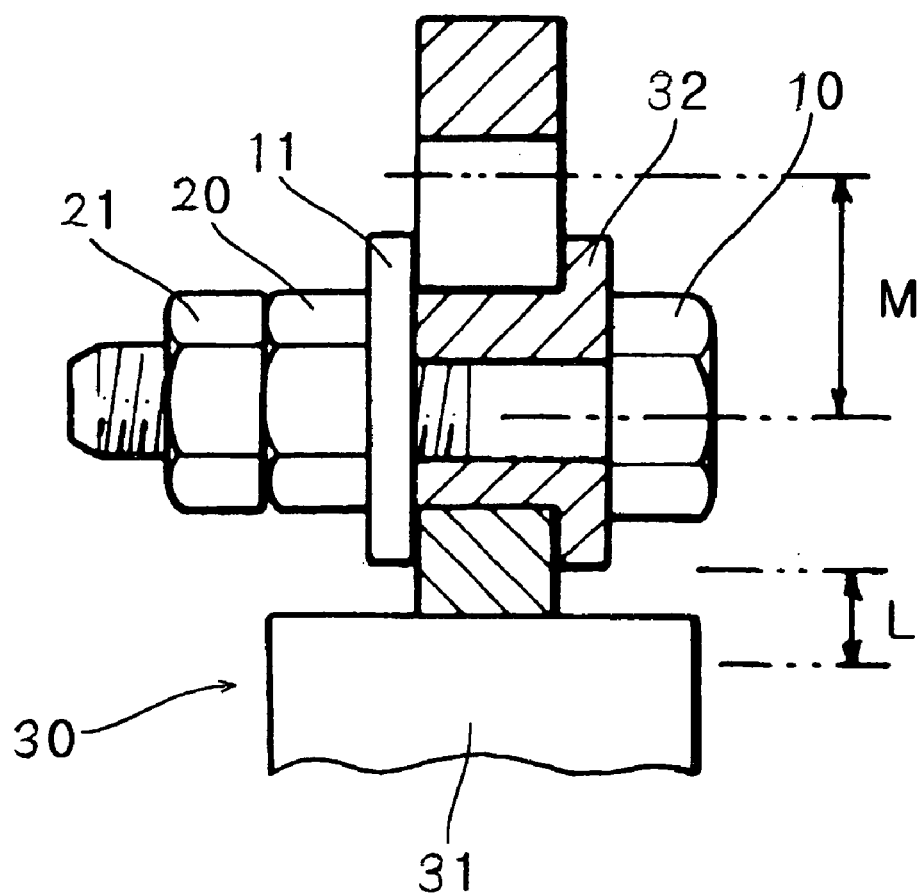

LOOSENESS PREVENTIVE NUT

BACKGROUND OF THE INVENTION

1. Field of the Invention

The present invention relates to a nut which is less prone to loosening even if vibrations are applied.

2. Description of the Related Art

Conventionally, nuts threadedly engaging with bolts have been used in large quantities together with bolts in all types of structures including motor vehicles, machines, and electrical equipment. The nut achieves excellent operation and effects as a fastener because it is firmly fitted by strong tightening, but it has a drawback in that when being used at a place where vibrations are applied, it is loosened by the vibrations.

To overcome this drawback, a method has been used in which two nuts are used in lapped manner as what is called a double nut. The double nut achieves an effect of being less prone to loosening as compared with the case where one nut is used as before (single nut) even if it is used at a place where vibrations are applied.

However, since the double nut uses two nuts, it is higher in cost than the single nut, and requires time and labor two times those for the single nut in installation.

SUMMARY OF THE INVENTION

The present invention has been made to solve the above problems, and accordingly an object thereof is to provide a looseness preventive nut which does not loosen even if vibrations are applied, and can be used as a single nut.

A first invention provides a looseness preventive nut 1 which is a nut threadedly engaging with a bolt 10, the nut being configured so that a lateral groove 3 extending in the radial direction in the range such that at least a part of a threaded portion 2 is cut, preferably in the range beyond the centerline C of the nut, is formed at a position slightly lower than a substantially middle point of the nut in the height direction.

A second invention provides a looseness preventive nut 1 which is a nut threadedly engaging with a bolt 10, the nut being configured so that a lateral groove 3 extending in the radial direction in the range such that at least a part of a threaded portion 2 is cut, preferably in the range beyond the centerline C of the nut, is formed at a position slightly lower than a substantially middle point of the nut in the height direction; the bearing surface of the nut is an inclined bearing surface 4 having an inclination angle θ of about 1° to 10°; and the extension of a neutral line P—P of the lateral groove 3 and the extension of a neutral line Q—Q of the inclined bearing surface 4 intersect each other.

BRIEF DESCRIPTION OF THE DRAWINGS

FIG. 1 is a view showing a first embodiment of a looseness preventive nut in accordance with the present invention, FIG. 1(*a*) being a front view, and FIG. 1(*b*) being a plan view;

FIG. 2 is a view showing a second embodiment of a looseness preventive nut in accordance with the present invention, FIG. 2(*a*) being a front view, and FIG. 2(*b*) being a plan view; and FIG. 3 is a front view showing a state in which the looseness of a nut is tested by using a high-speed screw looseness testing machine.

DESCRIPTION OF SYMBOLS

1 looseness preventive nut
2 threaded portion
3 lateral groove
4 inclined bearing surface
10 bolt
11 washer
20 tightening nut
21 locknut
30 high-speed screw looseness testing machine
31 vibration exciter
32 vibration barrel
θ inclination angle
C centerline
L exciting stroke
M impact stroke

DETAILED DESCRIPTION OF THE PREFERRED EMBODIMENTS

FIG. 1 shows a first embodiment of a looseness preventive nut 1 in accordance with the present invention. This looseness preventive nut 1 is a hexagon nut for threadedly engaging with a bolt 10, and is configured in a non-engaging state so that one and only one uniformly thick plate-shaped lateral groove 3 extending horizontally or perpendicular to a centerline C of the nut 1 in the radial direction in the range beyond the centerline C is formed at a position slightly lower than the middle point of the nut 1 in the height direction. The centerline C of the nut 1 aligns with a moving direction of a bolt when the bolt is being threaded into the nut 1. A neutral plane of the lateral groove 3 is perpendicular to the centerline C of the nut 1. Also, this nut 1 has a flat bearing surface parallel with the radial direction and an inclined bearing surface 4 having an inclination angle θ of 1° with respect to the horizontal plane. The inclined bearing surface 4 inclines towards the flat bearing surface with the inclination angle θ measured from one edge of the nut 1 to an opposite edge of the nut 1 across the centerline C of the nut 1. This inclined bearing surface 4 is formed so as to rise toward the side on which the lateral groove 3 is formed.

FIG. 2 shows a second embodiment of a looseness preventive nut 1 in accordance with the present invention. As in the case of the first embodiment, this looseness preventive nut 1 is also a hexagon nut, and is configured so that a lateral groove 3 extending in the radial direction in the range beyond the centerline C is formed at a position slightly lower than the middle point of the nut 1 in the height direction. Also, this nut 1 has an inclined bearing surface 4 having an inclination angle θ of 1° with respect to the horizontal plane, and the extension of a neutral line P—P of the lateral groove 3 and the extension of a neutral line Q—Q of the inclined bearing surface intersect each other. Unlike the first embodiment, the inclined bearing surface 4 of this looseness preventive nut 1 is formed so as to lower toward the side on which the lateral groove 3 is formed.

The above-described looseness preventive nuts 1 in accordance with the first and second embodiments are less prone to loosening even if vibrations are applied because they are formed with the lateral groove 3 and the inclined bearing surface 4.

The reason for this is thought to be that by forming the lateral groove 3, vibrations transmitted from the bolt 10, an object to be fastened, etc. are absorbed by the lateral groove 3, and the vibrations are prevented from being transmitted as they are to the whole of the nut 1. Also, the reason is thought to be that since the lateral groove 3 is formed in the range beyond the centerline C of the nut 1, a threaded portion 2 is partially cut, and thereby the transmission of vibrations is isolated by this cut portion.

Also, the reason is thought to be that the formation of the inclined bearing surface 4 also restrains the transmission of vibrations from the object to be fastened to the nut 1. Further, the reason is thought to be that the close contact of the nut 1 with the object to be fastened is achieved locally by the inclined bearing surface 4.

Although the lateral groove 3 is formed in the range beyond the centerline C of the nut 1 in the above-described embodiments, the present invention is not limited to this configuration. Even if the lateral groove is formed in the range such that a part of the threaded portion 2 is cut, the operation and effects can be achieved to some extent. Also, the lateral groove 3 can be formed in a slantwise direction, not in the horizontal direction. Further, although the inclination angle θ of the inclined bearing surface 4 is preferably 1° to 2° the inclination angle θ is not limited to this range of angle, and may be in the range of approximately less than 1° to 5°.

For an experiment, a nut with a thread diameter of 16 mm, a pitch of 2 mm, an opposite angle distance of 26.75 mm, an opposite side distance of 24 mm, and a height of 16.4 mm was used, and a lateral groove 3 with a width of 1 mm and a horizontal depth of 17 mm was formed at a position 6.5 mm distant from the bottom surface of the nut.

An experiment was conducted to compare the performance of the looseness preventive nut 1 in accordance with the present invention with that of the conventional single nut and double nut.

This experiment was conducted for 17 minutes (1020 seconds) using a high-speed screw looseness testing machine 30. FIG. 3 shows a state in which this testing machine 30 is used, and vibrations are applied to the nut (conventional nut) by a vibration exciter 31 and a vibration barrel 32 to test the looseness of the nut. The vibrating conditions of this testing machine 30 were as follows: the frequency was 1780 rpm, the exciting stroke L was 11 mm, the impact stroke M was 19 mm, and the vibration direction was a direction at right angles to the bolt axis. The looseness was judged with the time point at which the alignment marks of a washer 11, nut, and a bolt 10 shift from each other being the reference.

The results of this experiment are given in Table 1. In Table 1, No. 10 is the looseness preventive nut 1 in accordance with the first embodiment of the present invention, and No. 11 is the nut of the first embodiment in which the inclination angle θ of the inclined bearing surface 4 is changed from 1° to 2°. Also, No. 12 is the looseness preventive nut 1 in accordance with the second embodiment of the present invention, and No. 13 is the nut of the second embodiment in which the inclination angle θ of the inclined bearing surface 4 is changed from 1° to 2°.

From these experimental results, it is found that the looseness preventive nut 1 in accordance with the present invention has a higher looseness preventing function than the single nut of the related art, and also has a looseness preventive mechanism as high as that of the conventional double nut.

Specifically, the conventional single nut indicated as No. 9 was tightened with a torque of 194 N.m as in the case of the first embodiment of the present invention, and looseness occurred after 325 seconds had elapsed. In contrast, for the looseness preventive nut 1 in accordance with the present invention, looseness did not occur for 17 minutes.

Also, for example, for the conventional double nut indicated as No. 7, a tightening nut 20 was tightened with a torque higher than that of the looseness preventive nut 1 in accordance with the second embodiment of the present invention (the related art: 188 N.m, the present invention: 180 N.m), and additionally a locknut 21 was used. However, the effect of preventing looseness was the same. Therefore, it is found that the looseness preventive nut 1 in accordance with the present invention performs almost the same looseness preventive function as that of the conventional double nut though being of a simple configuration.

The looseness preventive nut 1 in accordance with the present invention is not limited to a hexagon nut, and includes various types of nuts such as a butterfly nut, castle nut, shank nut, cap nut, round nut, and spring nut.

Both of the looseness preventive nuts 1 in accordance with the first and second inventions are less prone to loosening even if vibrations are applied because the lateral groove 3 and the inclined bearing surface 4 are formed. Also, since they can be used as a single nut, they are lower in cost and the installation work thereof is easier than the double nut.

TABLE 1

| | Nut type | Torque (N · m) | Result |
|---|---|---|---|
| 1 | Conventional art | 193 | Loosened in 325 minutes. |
| 2 | The first embodiment (the inclination angle 1°) | 193 | Not loosened. |
| 3 | The first embodiment (the inclination angle 2°) | 193 | Not loosened. |
| 4 | The second embodiment (the inclination angle 1°) | 180 | Not loosened. |
| 5 | The second embodiment (the inclination angle 2°) | 180 | Not loosened. |

What is claimed is:

1. A looseness preventive nut for threadedly engaging with a bolt, said nut being configured in a non-engaging state so that one and only one uniformly thick plate-shaped lateral groove extending in a radial direction of said nut perpendicular to a centerline of said nut such that at least a part of a threaded portion is cut, and extending beyond the centerline of said nut, wherein the centerline of said nut aligns with a moving direction of said bolt when said bolt is being threaded into said nut; a neutral plane of said lateral groove is perpendicular to the centerline of said nut, said lateral groove is formed at a position slightly lower than a substantially middle point of said nut in the height direction, one flat bearing surface of said nut is parallel with the radial direction and the other one bearing surface of said nut is an inclined bearing surface having an inclination angle (θ) of 1° to 2° towards said flat bearing surface measured from one edge of said nut to an opposite edge of said nut across the centerline of said nut; and the extension of a neutral line of said lateral groove and the extension of a neutral line of said inclined bearing surface intersect each other.

* * * * *